US008066331B2

(12) United States Patent
Boes

(10) Patent No.: US 8,066,331 B2
(45) Date of Patent: Nov. 29, 2011

(54) HEADREST MECHANISM FOR CONTINUOUS ADJUSTMENT AND METHOD OF ASSEMBLY THEREOF

(75) Inventor: Klaus Boes, Allershausen (DE)

(73) Assignee: Lear Corporation, Southfield, MI (US)

( * ) Notice: Subject to any disclaimer, the term of this patent is extended or adjusted under 35 U.S.C. 154(b) by 385 days.

(21) Appl. No.: 12/398,324

(22) Filed: Mar. 5, 2009

(65) Prior Publication Data
US 2009/0230739 A1 Sep. 17, 2009

(30) Foreign Application Priority Data

Mar. 14, 2008 (DE) .......................... 10 2008 014 344

(51) Int. Cl.
*A47C 7/36* (2006.01)
(52) U.S. Cl. ...................................................... 297/410
(58) Field of Classification Search .................. 297/410, 297/353, 463.1
See application file for complete search history.

(56) References Cited

U.S. PATENT DOCUMENTS

| 4,256,341 | A | * | 3/1981 | Goldner et al. ............... 297/410 |
| 4,366,983 | A | | 1/1983 | Klueting et al. |
| 4,402,547 | A | | 9/1983 | Weston et al. |
| 4,429,919 | A | | 2/1984 | Klueting et al. |
| 4,469,375 | A | | 9/1984 | Boyer |
| 4,589,698 | A | | 5/1986 | Suzuki |
| 6,056,364 | A | * | 5/2000 | De Filippo ..................... 297/410 |
| 6,068,337 | A | * | 5/2000 | De Filippo ................ 297/410 X |
| 6,607,242 | B2 | | 8/2003 | Estrada et al. |
| 6,688,697 | B2 | | 2/2004 | Baumann et al. |
| 6,935,696 | B2 | | 8/2005 | Gauthier et al. |
| 7,070,240 | B2 | | 7/2006 | Schmitt et al. |
| 7,108,327 | B2 | | 9/2006 | Locke et al. |
| 7,137,668 | B2 | * | 11/2006 | Kreitler ......................... 297/410 |
| 7,316,455 | B2 | * | 1/2008 | Metz et al. .................... 297/410 |
| 2002/0043858 | A1 | | 4/2002 | Svantesson et al. |
| 2002/0093231 | A1 | | 7/2002 | Estrada et al. |
| 2004/0195872 | A1 | | 10/2004 | Svantesson |
| 2006/0001308 | A1 | | 1/2006 | Humer et al. |
| 2006/0061188 | A1 | | 3/2006 | Locke et al. |
| 2006/0186720 | A1 | | 8/2006 | Linardi et al. |

FOREIGN PATENT DOCUMENTS

DE 2131956 A 12/1972
WO 2006047341 A2 5/2006

* cited by examiner

*Primary Examiner* — Anthony D Barfield
(74) *Attorney, Agent, or Firm* — Brooks Kushman P.C.

(57) ABSTRACT

A continuously adjustable headrest mechanism 10 for a vehicle seat 12 and method of assembly thereof. The mechanism 10 includes in one aspect a pair of posts 17 that extends from vehicle seat 12. A pad 14 is moveably attached to each post 17. Positioned at least partially within the pad 14 is a locking subassembly 16 that has a disengaged and an engaged configuration that permits continuous adjustment of the pad 14 in relation to the post 17.

16 Claims, 3 Drawing Sheets

HEADREST MECHANISM FOR CONTINUOUS ADJUSTMENT AND METHOD OF ASSEMBLY THEREOF

CROSS-REFERENCE TO RELATED APPLICATIONS

This application claims foreign priority benefits under 35 U.S.C. §119(a)-(d) to DE 10 2008 014 344.8, filed Mar. 14, 2008, which is hereby incorporated by reference in its entirety.

BACKGROUND OF THE INVENTION

1. Field of the Invention

The present invention relates to (1) a head restraint for motor vehicle seats that enable a head restraint pad to be moved with respect to a motor vehicle seat; and (2) a method of assembly thereof.

2. Background Art

Motor vehicle seats typically include a head restraint pad mounted to the seat for comfort and safety of the passenger. The head restraint pad is usually mounted on one or two posts, which are inserted into guide sleeves affixed to the seat back. Prior art posts typically include retainer notches which allow the head restraint pad height to be vertically, but discretely adjustable.

Usually, the notches are engaged by a locking mechanism that holds the head restraint in place when it is not being adjusted. Although these prior art assemblies work reasonably well, the discrete nature of these head restraints does not allow the occupant to position them to several desired intermediate locations.

Among the art considered in preparing this application are the following U.S. references: U.S. Pat. No. 7,108,327 B2; U.S. Pat. No. 7,070,240 B2; US 2006/0061188 A1; US 2006/0001308 A1; U.S. Pat. No. 6,935,696 B2; US 2004/0195872 A1; U.S. Pat. No. 6,688,697 B2; U.S. Pat. No. 6,607,242 B2; US 2002/0043858 A1; U.S. Pat. No. 4,589,698.

The disclosures of these references are incorporated here by reference.

SUMMARY OF THE INVENTION

The present invention solves one or more problems of the prior art by providing in at least one embodiment, a head restraint assembly that is continuously positionable from a first position to a second position in relation to at least one post that is received within a seat back.

The pad is moveably attached to the post. A locking subassembly is positioned at least partially within the pad. The locking subassembly has a disengaged configuration and an engaged configuration. The disengaged configuration allows movement of the pad relative to the post and the engaged configuration inhibits movement of the pad relative to the post.

The pad is continuously displaceable to any position between a first position and a second position.

DETAILED DESCRIPTION OF THE PREFERRED EMBODIMENT(S)

Reference will now be made in detail to presently preferred embodiments and methods of the present invention, which constitute the best modes of practicing the invention presently known to the inventor. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a", "an", and "the" comprise plural reference unless the context clearly indicates otherwise. For example, reference to a component in the singular is intended to comprise a plurality of components.

Figure 1:
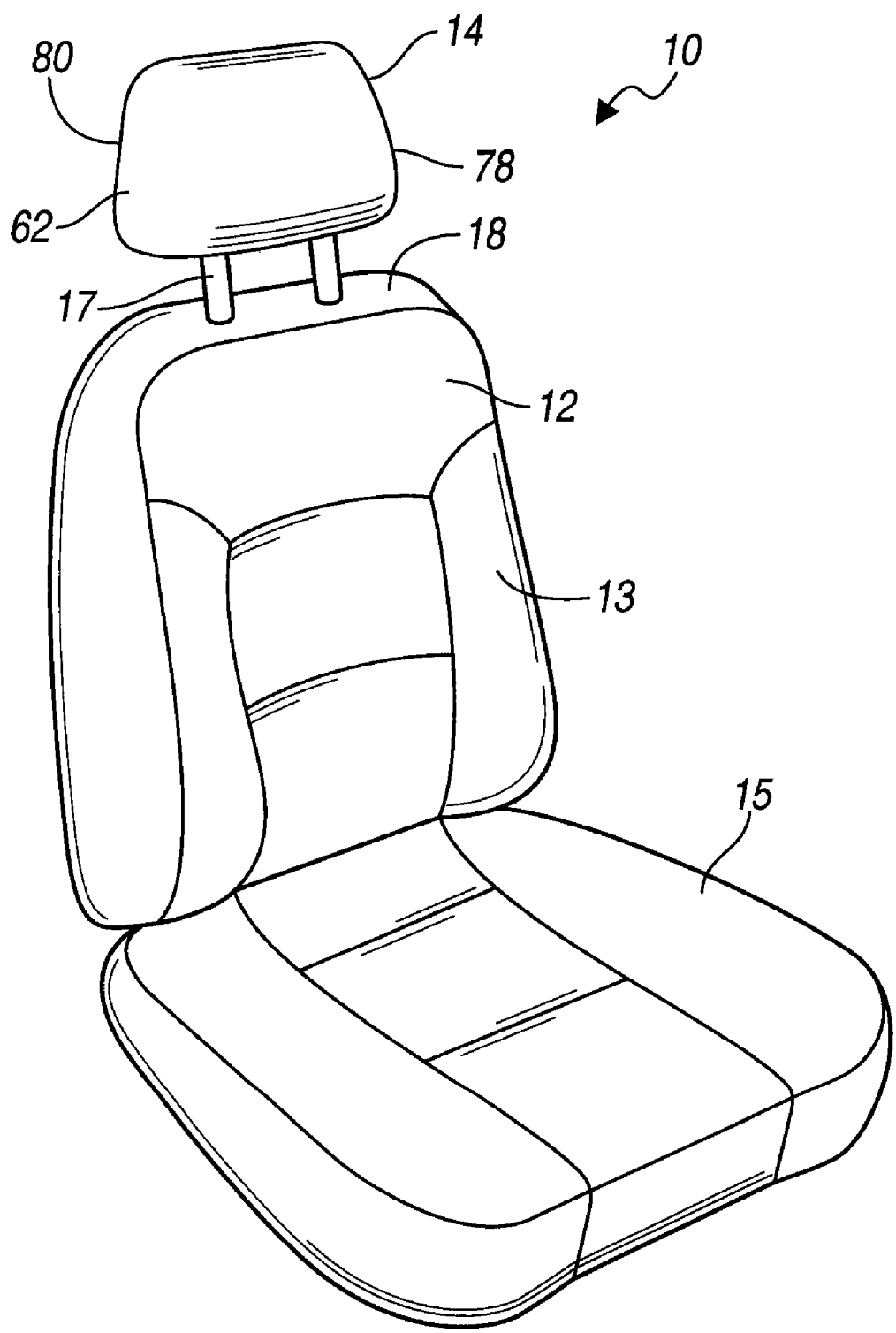
FIG. 1 is a quartering perspective view of a vehicle seat that includes a headrest mechanism extending therefrom.

Turning now to the drawings, FIG. 1 depicts an environment in which the disclosed invention functions. That figure depicts a headrest mechanism 10 for a vehicle seat 12. Conventionally, the vehicle seat 12 includes a seat back 13 and a seat cushion 15. Extending from the seat back 13 are one or more posts 17 that may be fixed or movable inwardly and outwardly in relation to the seat back 13.

A pad 14 is moveably attached to the one or more posts 17. Although the one or more posts 17 may be moveable inwardly or outwardly in relation to the seatback 13, the present invention concerns itself primarily with the positioning of the seat pad 14 upwardly or downwardly in relation to the one or more posts 17.

To enable this to happen, a locking subassembly 16 (FIGS. 1-3) is positioned at least partially within the pad 14. The locking subassembly 16 has a disengaged configuration and an engaged configuration. In the disengaged configuration, movement of the pad 14 in relation to the post 17 is permitted. But in the engaged configuration, depicted in FIGS. 2-3, movement of the pad 14 in relation to the one or more posts 17 is inhibited. By use of the disclosed invention, the pad 14 is continuously displaceable to any position between a first position 22 (FIG. 2) and a second position 24 in relation to the one or more posts 17.

Figure 3:
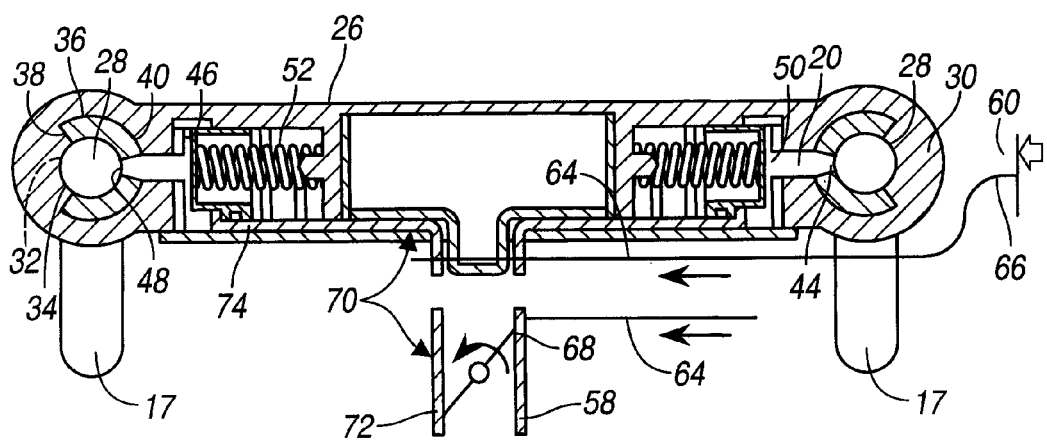
FIG. 3 is a sectional view taken along the line 111-111 of FIG. 2.

It is to be understood that the locking subassembly 16 is normally in the engaged configuration, as depicted in FIG. 3. To enable this to occur, the locking subassembly 16 engages the post 17 in a manner to be described. In the engaged position, the post is grasped by the locking subassembly 16 with a gripping force that is sufficient to impede movement of the pad 14 relative to the one or more posts 17 in such a way as to fix the pad's position in response to most impact forces that are normally encountered.

Continuing with reference to FIGS. 2-5, the locking subassembly 16 includes an elongate housing 26 (not shown in FIG. 2) that has a pair of apertures 28 that are defined within end regions 30 of the housing 26. The apertures define arcuate post-receiving surfaces 32. Each surface 32 has an inner arcuate segment 34 that engages the post 17, an outer arcuate segment 36 that receives a frusto-tubular sleeve or curved wedge 40, and a radially extending notch 38 that lies therebetween.

Figure 4:
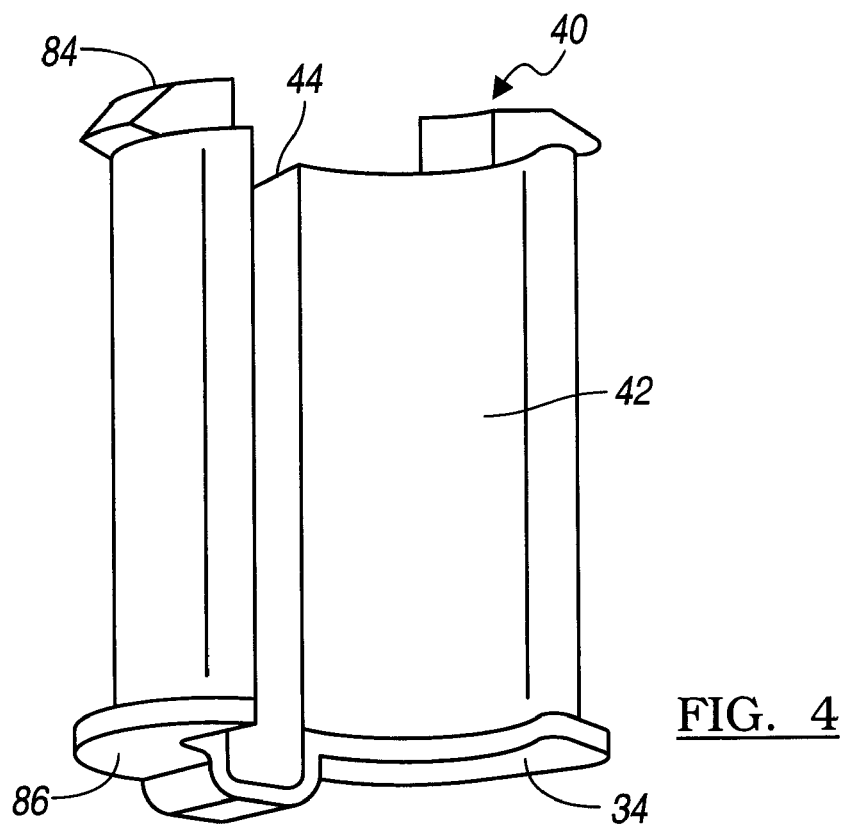
FIG. 4 is a quartering perspective view of one embodiment of a frusto-tubular sleeve.
Figure 5:
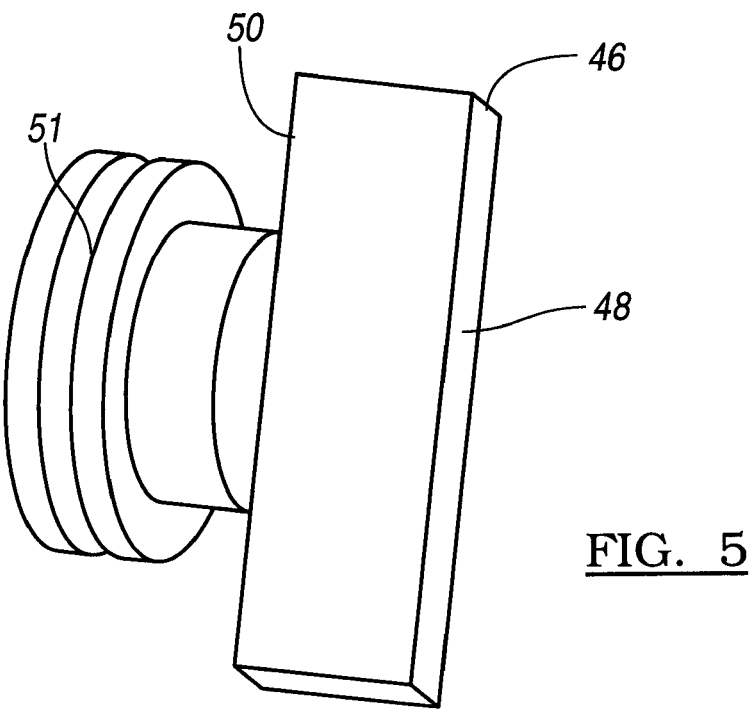
FIG. 5 is a wedge that engages the sleeve.

As indicated, part of the post-receiving surface 32 of an end region 30 of the housing 26 receives the frusto-tubular sleeve 40 (FIG. 4). The sleeve 40 has a complimentary inner surface 42 that mates with the post 17. The sleeve 40 also has an axially extending V-shaped groove 44 which receives a wedge 46 (FIG. 5).

When the locking subassembly 16 is in the engaged position, gripping or friction forces are exerted against the associated rod 64. Those forces are exerted by the inner arcuate segment 34 of the associated aperture 28 in the housing 26 and by a complimentary inner surface 42 of the frusto-tubular sleeve 40 under the influence of forces transmitted by the leading edge 48 of the wedge 46.

Figure 2:
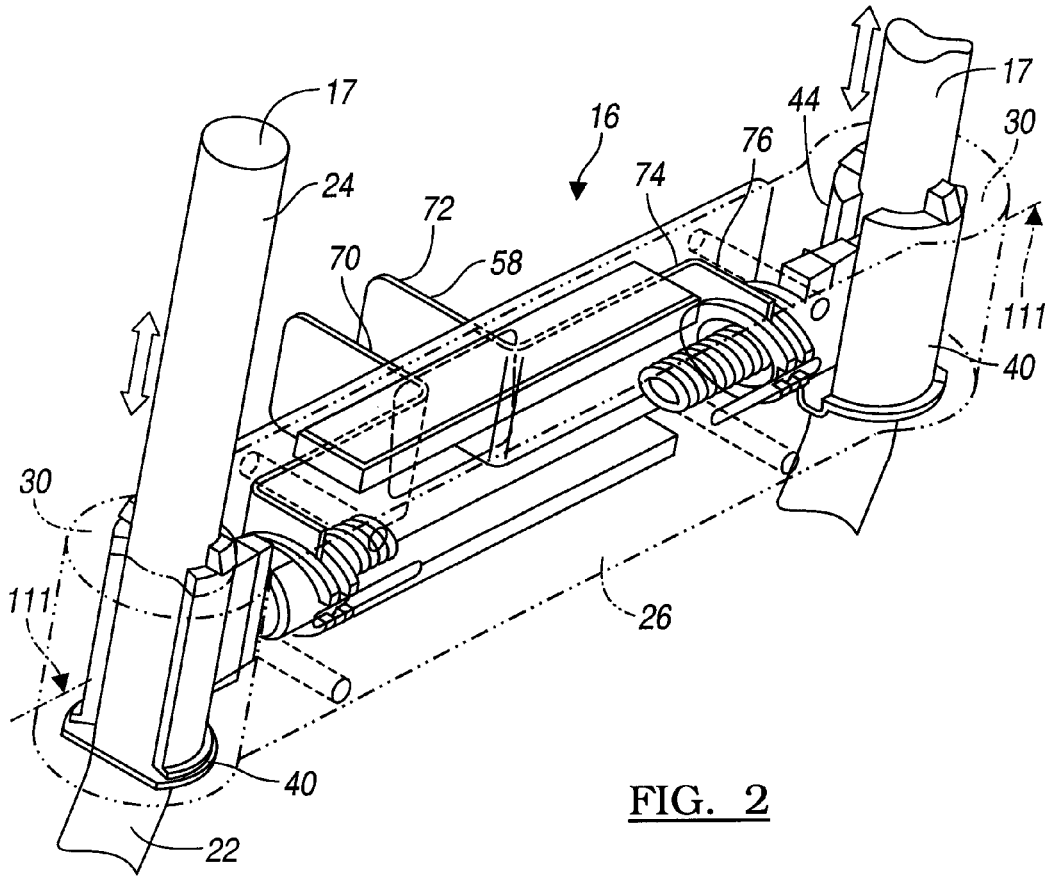
FIG. 2 is a quartering perspective view of one embodiment of headrest mechanism with the housing shown in phantom and the pad removed.

A leading end 48 is provided on the wedge 46 that is received by the V-shaped groove 44. Extending from the trailing end 50 of the wedge 46 is an annular trough 51 (FIG. 5). In a manner to be described shortly, the wedge 46 is displaceable between an engaged position as depicted in FIGS. 2, 3 and a disengaged position.

In one embodiment, a helical spring exemplifies means 52 for urging the wedge 46 into the engaged position. Other urging means are contemplated. They include, for example, a piston in a chamber that is motivated by air or hydraulic pressure. Electrically-actuated solenoid means for urging are also considered within the boundaries of the claimed invention.

Regardless of the specific alternative embodiment, the means 52 for urging the wedge 46 displaces the wedge 46 into the engaged position, thereby exerting an engagement force upon the wedge 46 so that it frictionally engages the associated post 17 in relation to the housing 26. In this manner, the pad 14 is firmly positioned in relation to the associated post 17.

In assembly, each frusto-tubular sleeve 40 (FIGS. 2, 4) is provided preferably with a set of tabs 84 that can be biased inwardly in relation to the associated aperture 28, returning to an engagement position when the sleeve is inserted into the aperture 28. To retain the sleeve 40 within the associated aperture 28, a collar 86 (FIG. 4) is provided at the other end of the frusto-tubular sleeve 40.

That the embodiment depicted in FIGS. 1-3 discloses two posts 17. But in theory, the invention can be adapted to only one post. In that embodiment, the means for urging the wedge would exert inwardly directed forces (within the frame of reference of FIG. 3) so that they would engage opposite sides of the same one post.

In operation, the posts 17 as depicted have a cross-section which is rounded, although the invention is not so limited. In practice, the invention could perform satisfactorily with one or more posts 17 that are circular, elliptical, or oval in cross-section. Furthermore, if there were only one post 17, its cross-section could be square, rectangular, or configured in a racetrack-like manner.

It will also be appreciated that the one or more posts 17 are engaged with a first force that is sufficient to impede movement of the pad in relation to the associated post 17 when the locking subassembly 16 is in the engaged configuration. Relatedly, when the wedge 46 is withdrawn from the V-shaped groove 44, the associated post 17 may be engaged with a second force that allows movement of the pad 14 relative to the post 17. Clearly, the second force is less than the first force.

In one embodiment, the frusto-tubular sleeve 40 has (as depicted) a smaller inner radius as compared to its outer radius. In some embodiments, the sleeve 40 functions as a curved wedge. If an engagement force is applied, both sleeve ends are urged into a self-locking position with respect to the posts 17. In that situation, any movement of the pad relative to the post is virtually blocked by application of frictional engagement forces. When the driving edge 66 is pushed to release, the Z-shaped plate in combination with the rod 64 and means for urging the wedge (such as spring 52) apply a force that is sufficient to overcome the self-locking condition.

Earlier, it was noted that the post-receiving surface 32 of one or more of the apertures 28 in the housing 26 include an inner arcuate segment 34, an outer arcuate segment 36, and a generally radially extending notch 38 lying therebetween. This configuration is depicted in FIG. 3. It will be appreciated that the outer arcuate segment 36 may be considered to have a first mean diameter, and the inner arcuate segment 34 to have a second mean diameter. It will be appreciated that the first mean diameter is greater than the second mean inner diameter, as shown in FIG. 3.

Continuing with reference to FIGS. 2-3, an actuator subassembly 58 is operable by a user to place the locking subassembly 16 in a disengaged configuration. In one embodiment, the actuator subassembly 58 (FIG. 3) comprises a button means 60 that preferably is located on an outside surface 62 (FIG. 1) of the pad 17. As contemplated herein, the term "button means" includes means for displacing a rod 64 in a manner to be described. Such means include a button, a switch, a rocker arm subassembly, and the like.

When the button 60 is depressed, a driven end 68 of the rod 64 is displaced. The driven end 68 is linked with a Z-shaped plate 70. In one embodiment, the Z-shaped plate 70 has a driving leaf 72 that is depicted in FIGS. 2 and 3. Associated with the driving leaf 72 is an intermediate leaf 74 (FIGS. 2, 3). The driven leaf 76 defines in one aspect an arcuate or semicircular end that engages with the annular trough 51 (FIG. 5) that is associated with the trailing end 50 of the wedge 46.

In operation, when the button means 60 is pushed to exert release forces, those forces are transmitted along the rod 64 to the Z-shaped plate 70 and then to the annular trough 51. This has the effect of retracting the leading edge 48 of the wedge 46 from the V-shaped groove 44 of the frusto-tubular sleeve 40 (FIG. 4).

In some embodiments, the button means 60 is located on an inboard surface of the pad 14 in relation to a lateral aspect of the vehicle, while in other embodiments, the button means 60 will be located on an outboard surface of the pad in relation to a lateral aspect of the vehicle.

Preferably, the driven leaf 72 is connected, at least indirectly, to the urging means, such as helical spring 52. As depicted in FIG. 3, the housing 26 defines a chamber that accommodates the helical spring. In this manner, activation of the button means 60 transmits a force via the actuator subassembly 58 to the locking subassembly 16 and disengages the wedge 46 from the frusto-tubular sleeve 40. That sleeve then releases its grasp, either completely or partially from around the associated post 17.

In a preferred embodiment, there are two posts 17 and two apertures 28 defined in the housing 26.

For ease of understanding, here are the reference numerals used in this disclosure, and the component to which they refer:

| Reference Numeral | Component |
| --- | --- |
| 10 | headrest mechanism |
| 12 | vehicle seat |
| 13 | seat back |
| 14 | pad |
| 15 | seat cushion |
| 16 | locking subassembly |
| 17 | post |
| 22 | first position |
| 24 | second position |
| 26 | elongate housing |
| 28 | aperture |
| 30 | end region |
| 32 | post-receiving surface |
| 34 | inner arcuate segment |
| 36 | outer arcuate segment |
| 38 | radially extending notch |
| 40 | frusto-tubular sleeve |
| 42 | complementary inner surface |
| 44 | V-shaped groove |
| 46 | wedge |
| 48 | leading end |
| 50 | trailing end |
| 51 | annular trough |
| 52 | means for urging the wedge |
| 58 | actuator subassembly |
| 60 | button means |
| 62 | outside member of the pad |
| 64 | rod |
| 66 | driving end |
| 68 | driven end |
| 70 | Z-shaped plate |
| 72 | driving leaf |
| 74 | intermediate leaf |
| 76 | driven leaf |
| 78 | outboard member |
| 80 | inboard member |
| 82 | chamber |
| 84 | tab |
| 86 | collar |

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A headrest mechanism for a vehicle seat, the headrest mechanism comprising:
a post associated with a vehicle seat;
a pad that is moveably attached to the post; and
a locking subassembly positioned at least partially within the pad, the locking subassembly having a disengaged configuration and an engaged configuration, the disengaged configuration allowing movement of the pad relative to the post and the engaged configuration inhibiting movement of the pad relative to the post, the pad being continuously displaceable to any position between a first position and a second position, the locking subassembly including:
an elongate housing having
an aperture defined within the housing, the aperture defining a post-receiving surface including an inner arcuate segment, an outer arcuate segment and a generally radially extending notch lying therebetween;
a frusto-tubular sleeve having a complementary inner surface that mates with the post and an axially extending V-shaped groove;
a wedge having a leading end that is received by the V-shaped groove and a trailing end, the wedge being displaceable between an engaged and disengaged position; and
means for urging the wedge into the engaged position, the means for urging exerting an engagement force upon the wedge so that it frictionally engages the post and that the pad is firmly positioned in relation thereto.

2. The headrest mechanism of claim 1, wherein the locking subassembly is normally in the engaged configuration.

3. The headrest mechanism of claim 1, wherein the locking subassembly engages the post when the locking subassembly is in the engaged configuration.

4. The headrest mechanism of claim 3, wherein the locking subassembly engages the post with a force sufficient to impede movement of the pad relative to the post.

5. The headrest mechanism of claim 1, wherein the post is engaged with a first force sufficient to impede movement of the pad relative to the post when the locking subassembly is in the engaged configuration.

6. The headrest mechanism of claim 5, wherein the post is engaged with a second force that allows movement of the pad relative to the post when the locking subassembly is in a disengaged configuration, the second force being less that the first force.

7. The headrest mechanism of claim 5, wherein the post is disengaged by the wedge of the locking subassembly, thereby allowing movement of the pad relative to the post.

8. The headrest mechanism of claim 1, wherein the outer arcuate segment receives the frusto-tubular sleeve and has a first mean inner diameter, the inner arcuate segment cooperating with the post and having a second mean diameter, the first mean inner diameter being greater than the second mean inner diameter.

9. The headrest mechanism of claim 1, further comprising an actuator subassembly that is operable by a user to place the locking subassembly in the disengaged configuration.

10. The headrest mechanism of claim 9, wherein the actuator subassembly comprises:
a button means located on the pad;
a rod having a driving end influenced by the button means, the rod being displaceable thereby, and a driven end;
a Z-shaped plate having a driving leaf connected to the driven end of the rod, an intermediate leaf, and a driven leaf connected to the intermediate leaf;
the driven leaf being connected to the urging means, so that activation of the button means transmits a force via the actuator subassembly to the locking subassembly and disengages the wedge from the post.

11. The headrest mechanism of claim 1, wherein there are two posts, one housing and two apertures defined in the housing for receiving the posts.

12. The headrest mechanism of claim 10, wherein the button means is located on an outboard surface of the pad in relation to a lateral aspect of the vehicle.

13. The headrest mechanism of claim 10, wherein the button means is located on an inboard surface of the pad in relation to a lateral aspect of the vehicle.

14. The headrest mechanism of claim 1, wherein the post has a cross-section that is selected from the group consisting of round, oval, elliptical and combinations thereof.

15. The headrest mechanism of claim 1, wherein the housing defines a chamber that accommodates the means for urging.

16. A headrest mechanism for a vehicle seat, the headrest mechanism comprising:

a pair of posts that are supported by a vehicle seat;
a pad that is moveably attached to the pair of posts; and
a pair of locking subassemblies positioned at least partially within the pad, each locking subassembly having a disengaged configuration and an engaged configuration, the disengaged configuration allowing movement of the pad relative to the posts and the engaged configuration inhibiting movement of the pad relative to the posts, the pad being continuously displaceable to any position between a first position and a second position, each locking subassembly including:
an aperture defined within an end region of an elongate housing, the aperture defining
a post-receiving surface including an inner arcuate segment, an outer arcuate segment that cooperates with a frusto-tubular sleeve and a generally radially extending notch lying there between;
the frusto-tubular sleeve having a complementary inner surface that mates with the post and an axially extending V-shaped groove;
a wedge having a leading end that is received by the V-shaped groove and a trailing end, the wedge being displaceable between an engaged and a disengaged position; and
means for urging the wedge into the engaged position, the means for urging exerting an engagement force upon the wedge so that it frictionally engages the post in relation to the housing so that the pad is firmly positioned in relation to the post.

* * * * *